United States Patent
Wang

(10) Patent No.: US 12,373,527 B2
(45) Date of Patent: Jul. 29, 2025

(54) INFORMATION PROCESSING METHOD AND APPARATUS BASED ON FACE RECOGNITION, STORAGE MEDIUM, AND TERMINAL

(71) Applicant: Tencent Technology (Shenzhen) Company Limited, Shenzhen (CN)

(72) Inventor: Shaoming Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 349 days.

(21) Appl. No.: 17/976,693

(22) Filed: Oct. 28, 2022

(65) Prior Publication Data

US 2023/0050957 A1 Feb. 16, 2023

Related U.S. Application Data

(63) Continuation of application No. PCT/CN2021/131051, filed on Nov. 17, 2021.

(30) Foreign Application Priority Data

Dec. 8, 2020 (CN) .......................... 202011441525.0

(51) Int. Cl.
*G06F 21/32* (2013.01)
*G06F 3/048* (2013.01)
(Continued)

(52) U.S. Cl.
CPC .............. *G06F 21/32* (2013.01); *G06F 3/048* (2013.01); *G06F 3/04847* (2013.01); *H04W 12/068* (2021.01)

(58) Field of Classification Search
CPC ...... G06F 3/048; G06F 3/04847; G06F 21/32; H04W 12/068
See application file for complete search history.

(56) References Cited

U.S. PATENT DOCUMENTS

| 10,257,495 B1 * | 4/2019 | Poder ................... G06V 40/172 |
| 10,530,580 B1 * | 1/2020 | Walker .................. H04L 9/3228 |

(Continued)

FOREIGN PATENT DOCUMENTS

| CN | 104182672 A | 12/2014 |
| CN | 107808118 A | 3/2018 |

(Continued)

OTHER PUBLICATIONS

Tencent Technology, WO, PCT/CN2021/131051, Jan. 28, 2022, 4 pgs.

(Continued)

*Primary Examiner* — Seth A Silverman
(74) *Attorney, Agent, or Firm* — Morgan, Lewis & Bockius LLP

(57) ABSTRACT

A method includes: in response to detecting a communication connection between the electronic device and the user equipment, obtaining a user instruction transmitted to the user equipment, the user instruction including at least one preset parameter for setting an interface feature of a target logical interface on the electronic device. The target logical interface is used for verifying an identity of a user. The method includes generating the target logical interface, by setting the interface feature based on the user instruction on the electronic device; obtaining verification information of a user; collecting a face image of the current user through the target logical interface; and verifying an identity of the current user based on the face image and the verification information.

20 Claims, 4 Drawing Sheets

(51) Int. Cl.
   *G06F 3/04847* (2022.01)
   *H04W 12/06* (2021.01)

(56) References Cited

U.S. PATENT DOCUMENTS

| | | | |
|---|---|---|---|
| 11,048,794 B1* | 6/2021 | Bordow | G06F 21/316 |
| 2004/0070566 A1* | 4/2004 | Ashton | G06F 21/85 |
| | | | 345/157 |
| 2012/0158798 A1 | 6/2012 | Patil | |
| 2015/0319169 A1 | 11/2015 | Cronin | |
| 2017/0147187 A1 | 5/2017 | Mu et al. | |
| 2018/0296091 A1* | 10/2018 | Wang | A61B 90/96 |
| 2019/0114060 A1 | 4/2019 | Resudek | |

FOREIGN PATENT DOCUMENTS

| | | |
|---|---|---|
| CN | 107818308 A | 3/2018 |
| CN | 108989571 A | 12/2018 |
| CN | 110532744 A | 12/2019 |
| CN | 110704011 A | 1/2020 |
| CN | 110955479 A | 4/2020 |
| CN | 112016023 A | 12/2020 |
| WO | WO 2012139270 A1 | 10/2012 |
| WO | WO 2018192406 A1 | 10/2018 |

OTHER PUBLICATIONS

Tencent Technology, IPRP, PCT/CN2021/131051, Jun. 13, 2023, 5 pgs.
Tencent Technology, ISR, PCT/CN2021/131051, Dec. 27, 2021, 3 pgs.

\* cited by examiner

INFORMATION PROCESSING METHOD AND APPARATUS BASED ON FACE RECOGNITION, STORAGE MEDIUM, AND TERMINAL

CROSS-REFERENCE TO RELATED APPLICATIONS

This application is a continuation application of PCT Patent Application No. PCT/CN2021/131051, entitled "FACIAL RECOGNITION-BASED METHOD AND DEVICE FOR INFORMATION PROCESSING, STORAGE MEDIUM, AND TERMINAL" filed on Nov. 17, 2021, which claims priority to Chinese Patent Application No. 202011441525.0, filed with the State Intellectual Property Office of the People's Republic of China on Dec. 8, 2020, and entitled "INFORMATION PROCESSING METHOD AND APPARATUS BASED ON FACE RECOGNITION, STORAGE MEDIUM, AND TERMINAL", all of which are incorporated herein by reference in their entirety.

FIELD OF THE TECHNOLOGY

This application relates to the field of communications technologies, and specifically, to an information processing method and apparatus based on face recognition, a storage medium, and a terminal.

BACKGROUND OF THE DISCLOSURE

With the development of the internet and the development of mobile communication networks, as well as the rapid development of the processing capability and the storage capability of a terminal, massive applications are rapidly spread and used, especially applications that require to authenticate an identity of a user before being normally used.

SUMMARY

Embodiments of this application provide an information processing method and apparatus based on face recognition, a storage medium, and a terminal, which implement the generation of a user interface (that is, a target logical interface) in a targeted manner based on features of a user, thereby effectively improving the fluency during using an electronic device and the diversity of the functions, and causing a verification result to be more reliable.

This embodiment of this application provides an information processing method base on face recognition, performed by an electronic device, the method including:

in response to detecting that the electronic device a communication connection between the electronic device and a user equipment, obtaining a user instruction transmitted by the user equipment, where the user instruction includes at least one preset parameter for setting an interface feature of a target logical interface on the electronic device, and the target logical interface is used for verifying a user identity;

generating the target logical interface, by setting the interface feature based on the user instruction transmitted by the user equipment;

obtaining verification information of the user;

collecting a face image of a current user through the target logical interface; and verifying an identity of the current user based on the face image and the verification information.

This embodiment of this application further provides an information processing method base on face recognition, performed by user equipment, the method including:

in response to detecting a communication connection between an electronic device and the user equipment, transmitting a user instruction to the electronic device based on pre-saved configuration information, the user instruction including at least one preset parameter for setting an interface feature of a target logical interface used for verifying an identity of a user on the electronic device; and the electronic device setting the interface feature on the electronic device according to the user instruction to generate the target logical interface; and obtaining verification information of the user, collecting a face image of a current user through the target logical interface, and verifying an identity of the current user based on the face image and the verification information.

Correspondingly, this embodiment of this application further provides an information processing apparatus base on face recognition, including:

an instruction obtaining unit, configured to obtain, after detecting that the electronic device establishes a communication connection with user equipment, a user instruction transmitted by the user equipment, where the user instruction includes at least one preset parameter for setting an interface feature of a target logical interface on the electronic device, and the target logical interface is used for verifying a user identity;

a presentation unit, configured to set the interface feature on the electronic device according to the user instruction to generate the target logical interface;

an information obtaining unit, configured to obtain verification information of the user;

a collection unit, configured to collect a face image of a current user through the target logical interface; and a verification unit, configured to verify an identity of the current user based on the face image and the verification information.

Correspondingly, this embodiment of this application further provides another information processing apparatus base on face recognition, including:

a receiving unit, configured to receive a logical interface setting instruction triggered by a user through a user operation page displayed by an application;

a display unit, configured to display a logical interface setting page according to the logical interface setting instruction;

a content obtaining unit, configured to obtain target content inputted by the user through the logical interface setting page;

a generation unit, configured to generate configuration information based on the target content; and a processing unit, configured to transmit, in response to detecting a communication connection between the user equipment and an electronic device, a user instruction to the electronic device based on the configuration information, the user instruction including at least one preset parameter for setting an interface feature of a target logical interface on the electronic device, and the target logical interface being used for verifying an identity of a user;

the electronic device setting the interface feature on the electronic device according to the user instruction to generate the target logical interface; and obtaining verification information of the user, collecting a face image of a current user through the target logical interface, and verifying an identity of the current user based on the face image and the verification information.

Correspondingly, this embodiment of this application further provides a computer-readable storage medium, storing a plurality of instructions, the plurality of instructions being configured to be loaded by a processor, to perform the information processing method based on face recognition as described above.

Correspondingly, this embodiment of this application further provides a terminal, including a memory, a processor, and a computer program stored on the memory and executable on the processor, the processor, when executing the program, implementing the information processing method based on face recognition as described above.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other accompanying drawings from these accompanying drawings without creative efforts.

DESCRIPTION OF EMBODIMENTS

Figure 1:
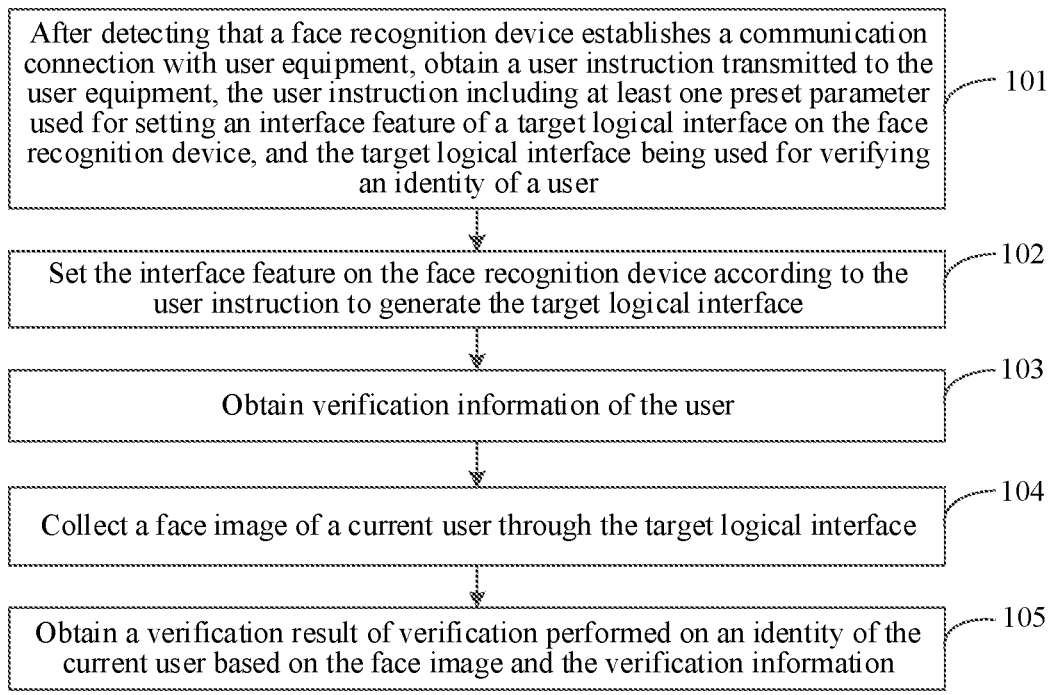
FIG. 1 is a schematic flowchart of an information processing method based on face recognition according to an embodiment of this application.

The technical solutions in the embodiments of this application are clearly and completely described below with reference to the accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application.

Current face recognition-related applications all have inherent interface display logic, but the inherent interface logic may have a specific impact on the use of the device by different users. For example, a user with poor eyesight (such as the elderly or nearsighted people) tends to fail to see interface content clearly due to a small user interface; and for a user with a high security requirement, the security of user information tends to be affected due to a simple interface display logic in a face-scanning process.

Embodiments of this application provide an information processing method and apparatus based on face recognition, a storage medium, and a terminal. The information processing apparatus based on face recognition may be specifically integrated in a terminal device with a camera and a storage unit such as a tablet personal computer (PC), a mobile phone, and a microprocessor installed with computing capability.

Artificial intelligence (AI) is a theory, a method, a technology, and an application system that use a digital computer or a machine controlled by the digital computer to simulate, extend, and expand human intelligence, perceive an environment, obtain knowledge, and use knowledge to obtain an optimal result, to cause the machine to have the functions of perception, reasoning, and decision-making.

Computer vision (CV) is a science that studies how to use a machine to "see", and furthermore, that uses a camera and a computer to replace human eyes to perform machine vision such as recognition, tracking, and measurement on a target, and further perform graphic processing, so that the computer processes the target into an image more suitable for human eyes to observe, or an image transmitted to an instrument for detection. The CV technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biometric feature recognition technologies such as common face recognition and fingerprint recognition.

In this solution, face recognition technology is used to perform recognition on the collected face images, and authenticate an identity of a user based on a face recognition result, so as to provide a determining standard for a series of subsequent information processing operations based on face recognition, and achieve the objective of intelligent processing of information.

Detailed descriptions are separately performed below. FIG. 1 is a schematic flowchart of an information processing method based on face recognition according to an embodiment of this application. The information processing method based on face recognition may be applicable to an electronic device (also known as "face recognition device" in this specification), and specific processes may be as follows:

101. In response to detecting a communication connection between the face recognition device and a user equipment, obtain a user instruction transmitted to the user equipment, the user instruction including at least one preset parameter for setting an interface feature of a target logical interface on the face recognition device, and the target logical interface being used for verifying an identity of a user.

Specifically, when the face recognition device detects a communication connection is between the face recognition device and a user equipment, a user instruction transmitted by the user equipment is obtained. The face recognition device may be a device that can provide the user with services related to face-scanning together with the backend, such as a vending machine, a POS machine, or a cash machine with a face-scanning function. The user equipment may be a mobile smart terminal device such as a smart phone and a tablet computer.

In a specific implementation, the face recognition device may establish a communication connection with the user equipment through short-range communication, such as Bluetooth (BT), wireless high-fidelity (Wi-Fi), ZigBee technology, IrDA technology, near field communication (NFC), ultra-wideband technology (UWB), or the like.

In some embodiments, the target logical interface may be a UI interface on the face recognition device, for example, the UI interface displayed on the face recognition device when face-scanning payment is performed by using the face recognition device. The UI interface may include a face recognition control, a verification information input control, or the like, so that the user can complete the verification of the identity through the UI interface. In some embodiments, the user instruction may include a control instruction for controlling a function item of the generated target logical interface, for example, may be a control instruction triggered by a user through an application client installed in the user equipment. The control instruction may specifically control a display instruction displayed on the target logical interface, or a payment instruction for submitting an order for a specific commodity. The face recognition device may obtain a user instruction transmitted by the user equipment through a wireless link with the user equipment.

102. Set the interface feature on the face recognition device according to the user instruction to generate the target logical interface.

In this embodiment, shopping and transaction applications may be installed in the face recognition device, and the user may perform payment through the face-scanning function of the face recognition device after purchasing a product. For example, when the user adds a product to the wish list and submits an order for purchase by using the shopping application installed in the terminal, a payment instruction may be triggered.

However, because different users have different requirements for the UI interface, a single UI interface design cannot simultaneously meet the needs of everyone. For example, the user with poor eyesight (such as the elderly and nearsighted people) hopes that the presentation of the UI control is larger, so that it is easy to operate; the user with a relatively high security requirement hopes that the operation logic design of the UI interface is more complicated; and a user with a relatively high requirement for convenience hopes that the operation logic of the UI interface is as simple as possible. Based on this, in this embodiment of this application, an operation entry for controlling the display of the UI interface is added on a user equipment side to customize an interface style or operation logic required by each user. When the face recognition device is used to perform related service operations, the user equipment may transmit the user instruction to the face recognition device based on the pre-defined setting information, so that the face recognition device responds to the user instruction after receiving the user instruction, and instructs to generate the target logical interface according to a preset parameter included in the user instruction and corresponding to at least one interface feature (such as interface style and operation logic) of the logical interface. Therefore, compared with the related art, a user interface (that is, a target logical interface) is generated in a targeted manner based on features of a user, thereby effectively improving the diversity of the functions of the face recognition device and the fluency of the device during use, and causing a verification result to be more reliable.

In some embodiments, the at least one preset parameter includes: an interface identification parameter, an interface attribute parameter, and a security setting parameter of a to-be-displayed interface. Step 102 may include the following processes:

invoking a specified interface component to construct an initial logical interface corresponding to the interface identification parameter; and adjusting the initial logical interface to obtain the target logical interface according to the interface attribute parameter and the security setting parameter.

Specifically, after receiving the user instruction, the face recognition device transmits the user instruction to a parsing layer for parsing. An interface identification parameter, an interface attribute parameter, and a security setting parameter of a to-be-displayed interface are obtained by parsing. Then the parsed information is transmitted to a UI control layer. The UI control layer determines a to-be-used interface component activity (that is, the specified interface component) according to the interface identification parameter of a to-be-displayed interface, then constructs a corresponding initial logical interface based on the specified interface component, and then adjusts the currently constructed initial logical interface based on the interface attribute parameter and the security setting parameter obtained by parsing the user instruction to obtain the target logical interface. The target logical interface is a logical interface precisely set according to the features of the user.

In some embodiments, when the initial logical interface is adjusted according to the interface attribute parameter and the security setting parameter, details are as follows:

adjusting an interface layout of the initial logical interface according to the security setting parameter, and associating corresponding operation logic with the adjusted initial logical interface; and adjusting an interface attribute the adjusted initial logical interface according to the interface attribute parameter.

The security setting parameter may be a security level. The higher the security level, the higher the requirement for the security and privacy of the interface, and the more complex the operation logic of the required logical interface. Because the interface layout and operation logic are closely related, an interface layout of the current logical interface may be adjusted based on the security setting parameter, and corresponding operation logic is associated with the adjusted initial logical interface. For example, the currently generated logical interface only has a face verification region, and a security level corresponding to the parsed security setting parameter requires secondary password verification. Therefore, a secondary password verification region may be added to the current logical interface, so that the user may input a password through the secondary password verification region to perform secondary verification of his/her identity. Therefore, compared with the related art, the present invention implements a plurality of verification of the identity of the user, effectively resolves the problem of low security of user data processing in the related art, prevents the improper use or theft of the identity of the user, and causes the verification result to be more secure and reliable.

The interface attribute parameter may be an interface attribute parameter such as a font size, an interface color, or an interface style. The face recognition device adjusts the interface attribute of the logical interface after adjusting the interface layout and the operation logic according to the interface attribute parameter, so as to obtain a logical interface that fully considers the features of the user. For example, the font size in the current logical interface is 12, the overall color style of the interface is black, while the font size indicated in the interface attribute parameter is 24, and the color is red. Then, based on the interface parameter, the font size of the current logical interface may be adjusted from 12 to 24, and the color may be adjusted from black to red, so as to implement the adjustment of the interface attribute. In some embodiments, the interface attribute parameter is automatically set by the user equipment according to information such as an age and a health status inputted by the user in the user equipment. For example, the user equipment may automatically set the font size according to the age of the user, and may automatically set the interface color, or the like according to the health status of the user (such as color blindness, or the like). In some embodiments, the age and health status of the user may also be provided to the face recognition device, and the face recognition device automatically adjusts the display of the interface based on features such as the age and health status of the user.

In practical applications, if a system version of an application client in the user equipment is relatively advanced, and the face recognition device system is not updated to match the system version of the application client in time, the face recognition device control may fail to be controlled (for example, the user instruction transmitted by the user equipment indicates that the interface color is changed to red. However, there is no such option in the system of the face recognition device, resulting in a control error). Therefore, in some embodiments, a system version update request is transmitted to a server in response to detecting that adjustment performed on the initial logical interface fails. In response to receiving update data returned by the server according to the version update request, a system version is updated based on the update data. Therefore, the face recognition device may be adapted to the application client in the user equipment after the system version is updated. Therefore, compared with the related art, in the present invention, the real-time adaptation of the face recognition device and the user equipment are implemented, thereby effectively improving the reliability of the face recognition and a verification result of the identity of the user.

Specifically, recognition may be performed on the face image by using an image recognition algorithm. In practical applications, to improve the processing speed, an offline recognition algorithm may be deployed in the face recognition device, and a local database including sample face images may be set up to implement offline recognition of a face image on a local side of the face recognition device. Alternatively, a recognition instruction may be transmitted to the server to implement online recognition of the face image on a server side.

103. Obtain verification information of a user.

In some embodiments, after the user equipment is connected to the face recognition device, the verification information of the user (such as mobile phone number) may be transparently transmitted to the face recognition device directly through a connection such as Bluetooth, and the user does not need to input the verification information on the face recognition device.

In other embodiments, the face recognition device may obtain verification information inputted by the user through the target logical interface. In this case, the target logical interface includes: an input control, where the input control may be displayed on the target logical interface in the form of an input box. When the verification information inputted by the user is obtained through the target logical interface, the following processes may be included:

obtaining the verification information inputted by the user through the input control;

determining operation logic corresponding to the input control; and prompting the user to re-input the verification information in a case that the verification information does not satisfy the operation logic corresponding to the input control.

In some embodiments, the input control includes: a first sub-control and a second sub-control. When the verification information inputted by the user through the input control is obtained, specifically, a communication identifier (for example, mobile phone number) inputted by the user may be obtained through the first sub-control, and the password information inputted by the user may be obtained through the second sub-control. That is, in this embodiment, in response to performing verification on the identity of the user, in addition to verifying the face, secondary verification further needs to be performed through the communication identifier, the password information, or the like to improve the security of account information. A plurality of verification of the identity of the user is implemented, the problem of low security of user data processing in the related art is effectively resolved, the improper use or theft of the identity of the user is prevented, and the verification result is caused to be more secure and reliable.

In practical applications, an internal operation logic of the input control may require the input of the verification information in a specific format. For example, the input control may require the input of a 13-digit valid mobile phone number or a 4-digit tail number. If a 5-digit string is inputted, the user is prompted to re-input the verification information.

104. Collect a face image of a current user through the target logical interface.

Specifically, the face image is a real face image collected in real time in a current scenario. In practical applications, a camera (preferably a front camera in this embodiment) built in the face recognition device may be used to perform detection on a current scenario image to obtain a face image that meets the requirement. For example, to effectively resist malicious behaviors such as taking a photo, swapping face, masking, blocking, and taking a picture on a screen, face images that can be screened through local optimization and a liveness process may be collected. In a specific implementation, liveness detection may be performed through combined actions such as blinking, opening mouth, shaking head, and nodding, and using technologies such as face key point location and face tracking to verify whether the user is a real living body.

105. Verify an identity of the current user based on the face image and the verification information.

In practical applications, to improve the processing speed, an offline recognition algorithm may be deployed in the face recognition device, and a local database including sample face images may be set up to implement offline recognition of a face image on a local side of the face recognition device. Alternatively, the face image and verification information may be transmitted to the server, so as to implement online verification of the face image and verification information on the server side. The verification information may include the communication identifier and password information. Specifically, when the identity of the current user is verified based on the face image and the verification information, the following processes may be included:

verifying the face image based on a sample face image in a preset face database;

in a case that a target sample face image matching the face image is included in the preset face database, obtaining a sample communication identifier and sample password information that are associated with the target sample face image;

verifying the communication identifier based on the sample communication identifier, and verifying the password information based on the sample password information; and determining that verification performed on the identity of the current user succeeds in a case that verification performed on the communication identifier succeeds and verification performed on the password information succeeds.

Face data of a plurality of users is inputted in a preset face database, and each piece of face data is pre-associated with a corresponding sample identifier and sample password information (but the inputted face data is provided by the user). The preset database may be set locally in the device or may also be stored in a server corresponding to the device system.

In a verification process of the face recognition, the face image is first preprocessed. The preprocessing process mainly includes light compensation, grayscale transformation, histogram equalization, normalization, geometric correction, filtering, and sharpening of the face image. Then, features of the face image are extracted, which is a process of modeling the features of the face. In a specific implementation, a knowledge-based representation method and an algebraic feature-based or statistical learning-based representation method may be used to extract the features of the face.

The knowledge-based representation method mainly obtains feature data that helps face classification according to the shape description of face organs and distance features between the face organs. The feature components usually include a Euclidean distance, a curvature, and an angle between feature points. A face is composed of parts such as eyes, nose, mouth, chin, or the like. The geometric description of these parts and a structural relationship between the parts may be used as an important feature to recognize the face, and these features are referred to as geometric features. Knowledge-based face representation mainly includes a geometric feature-based method and a template matching method.

Finally, face image matching and recognition are performed. Specifically, extractable feature data of the face image is compared with a face feature template in the local database, and identity information of the face is determined according to the degree of similarity.

Specifically, after the verification performed on the face image succeeds, the sample communication identifier and sample password information that are associated with a target sample face image may be obtained as a verification benchmark. Then, the communication identifier is verified based on the sample communication identifier, and the password information is verified based on the sample password information, so as to determine whether the current identity of the user is true and valid by the secondary verification. It is determined that verification performed on the identity of the current user succeeds in a case that verification performed on the communication identifier succeeds and verification performed on the password information succeeds. In this case, related service operations may be performed. For example, if the target logical interface is a payment interface, a corresponding payment operation may be performed.

This embodiment of this application provides the information processing method based on face recognition. After detecting that a communication connection is established with user equipment, a user instruction transmitted to the user equipment is obtained, the user instruction including at least one preset parameter for setting an interface feature of a target logical interface on the face recognition device, and the target logical interface being used for verifying an identity of a user. The interface feature is set according to the user instruction, the target logical interface is generated, and the target logical interface is displayed; verification information of a user is obtained; a face image of the current user is collected through the target logical interface; and a verification result of verifying the identity of the current user is obtained based on the face image and the verification information. In this solution, the display of the logical interface of the face recognition device is controlled by providing an operation entry for setting customized face-related services through the application client, which implements the generation of a user interface (that is, a target logical interface) in a targeted manner based on features of a user, thereby effectively improving the fluency during using a face recognition device and the diversity of the functions, and causing a verification result to be more reliable.

Figure 2:
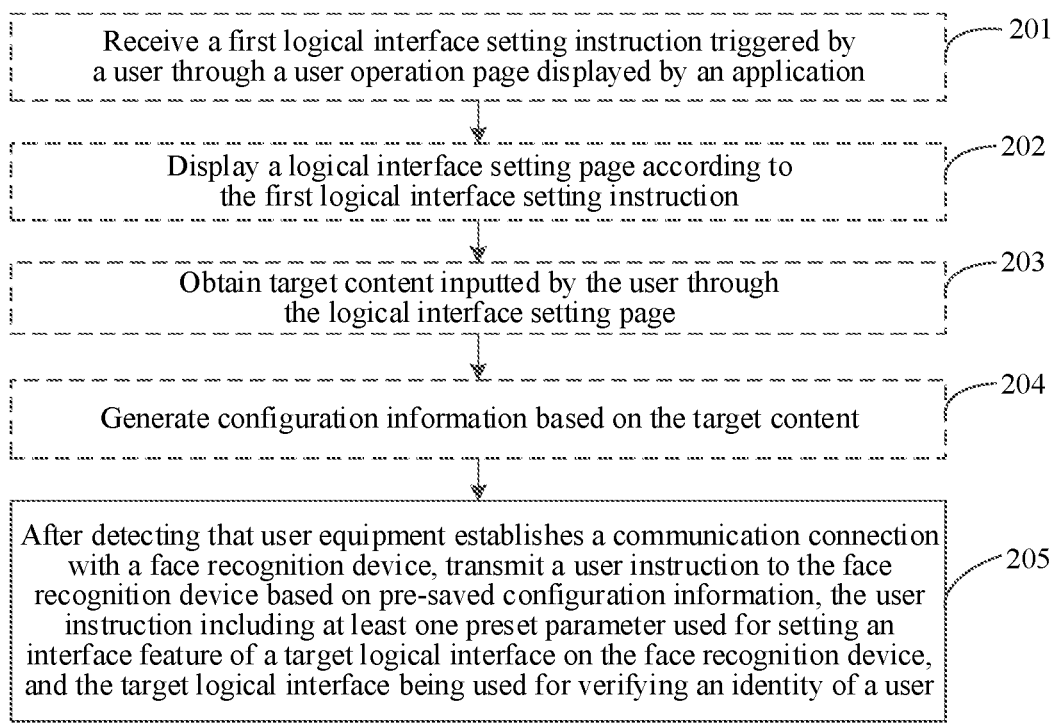
FIG. 2 is another schematic flowchart of an information processing method based on face recognition according to an embodiment of this application.

FIG. 2 is a schematic flowchart of an information processing method based on face recognition according to an embodiment of this application. The information processing method based on face recognition may be applicable to user equipment, and specific processes may be as follows:

201. Receive a first logical interface setting instruction triggered by the user through the user operation page displayed by an application.

In this embodiment, the user equipment may be a mobile smart terminal device such as a smart phone and a tablet computer. An application client may be installed in the user equipment, and an operation entry (that is, a user operation page) may be set in the application client for setting the display of the logical interface of the face recognition device. In practical applications, the user operation page may include a trigger control, and the user may trigger the logical interface setting instruction.

In some implementations, the trigger control is a visual control, that is, the trigger control may be displayed on the user operation page. By performing operations such as clicking, touching, and sliding on the trigger control, a mini program search instruction may be triggered.

In some embodiments, the trigger control may further be a control without an entity form, that is, the trigger control is invisible to the user. In a specific implementation, the mini program search instruction may be triggered by operations such as shaking, tapping, or the like on a display screen of a terminal or a terminal body on the user operation page.

202. Display a logical interface setting page according to the first logical interface setting instruction.

Specifically, the first logical interface setting instruction may carry a page identifier of a to-be-displayed page. After receiving the first logical interface setting instruction, the device may invoke a corresponding interface component to render and update a current page based on the page identifier carried by the first logical interface setting instruction, so as to switch the current page to the logical interface setting page indicated and displayed by the first logical interface setting instruction.

203. Obtain target content inputted by the user through the logical interface setting page.

A form of the target content may be one or more of text information, image information, voice information, and video information. In some embodiments, the logical interface setting page includes a content input control, and the user may input target content through the content input control.

Specifically, there are a plurality of manners to input the target content. For example, the information input control may be a text input box, and the input of the target content is implemented by inputting text information in the text input box; in another example, the information input control may be an image input control. By triggering the image input control, the locally stored image data may be read, and the corresponding interface attribute parameter and/or interface layout information may be obtained by parsing the locally stored image data as an input; or a camera of the terminal may further be invoked through the image input control to capture other interface images in the current scenario, and the corresponding interface attribute parameter and/or interface layout information may be obtained through parsing the other interface images, so as to implement the input of the target content.

In addition, a microphone built in the user equipment may be invoked via voice on the logical interface setting page, voice information inputted by the user is obtained through the microphone, and recognition is performed on the voice information, so as to implement the input of the target content.

204. Generate configuration information based on the target content.

Specifically, based on the target content inputted by the user, valid content may be extracted from the target content according to a preset rule to generate configuration information in a specified format.

Step 201 to step 204 may be performed only once, and do not need to be performed every time before establishing a connection with the face recognition device. After the user completes the settings through step 201 to step 204, and subsequently needs to handle face recognition related services, a user instruction may be directly transmitted to the face recognition device according to the generated configuration information.

205. After detecting that the user equipment establishes a communication connection with a face recognition device, transmit a user instruction to the face recognition device based on the configuration information, the user instruction including at least one preset parameter for setting an interface feature of a target logical interface on the face recognition device, and the target logical interface being used for verifying an identity of a user.

In a specific implementation, the face recognition device may establish a communication connection with the user equipment through short-range communication, such as Bluetooth (BT), wireless high-fidelity (Wi-Fi), ZigBee technology, IrDA technology, near field communication (NFC), ultra-wideband technology (UWB), or the like. The user equipment may transmit a user instruction to the face recognition device through a wireless link with the face recognition device.

In this embodiment, the face recognition device may be a device that can handle the face-scanning related services, such as a vending machine and a cash register with a face-scanning function. shopping and transaction applications may be installed in the face recognition device, and the user may perform payment through the face-scanning function of the face recognition device after purchasing a product. For example, when the user adds a product to the wish list and submits an order for purchase by using the shopping application installed in the terminal, a payment instruction may be triggered, and an interface setting request is transmitted to the user equipment. In response to the interface setting request, the user equipment transmits a user instruction to the face recognition device based on the configuration information, so as to control the display of the logical interface of the face recognition device.

In some embodiments, after the user instruction is transmitted to the face recognition device based on the configuration information, if a second logical interface setting instruction triggered by the user through the user operation page is detected, a logical interface setting page is displayed based on the second logical interface setting instruction. The logical interface setting page displays the setting content corresponding to the configuration information.

In the information processing method based on face recognition provided in this embodiment of this application, in response to receiving a logical interface setting instruction triggered by the user through the user operation page displayed by the application, a logical interface setting page is generated and displayed according to the logical interface setting instruction, target content inputted through the logical interface setting page is obtained, and configuration information is generated based on the target content. After detecting that a communication connection is established with the face recognition device, a user instruction is generated based on the configuration information, and the user instructions transmitted to the face recognition device. In this solution, the display of the logical interface of the face recognition device is controlled by providing an operation entry for setting customized face-related services through the application client, which implements the generation of a user interface (that is, a target logical interface) in a targeted manner based on features of a user, thereby effectively improving the fluency during using a face recognition device and the diversity of the functions, and causing a verification result to be more reliable.

Figure 3:
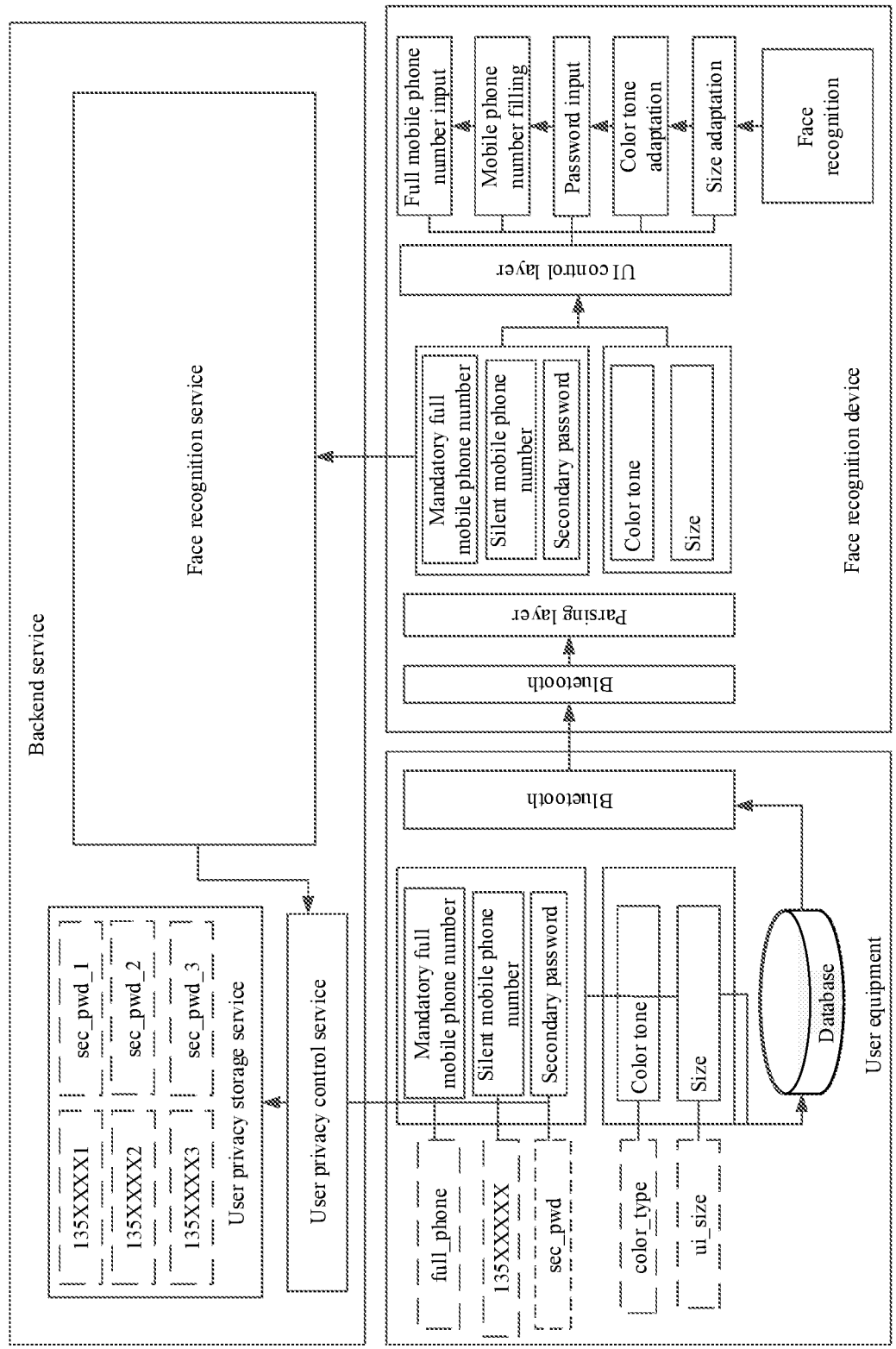
FIG. 3 is a schematic flowchart of an architecture of an information processing system based on face recognition according to an embodiment of this application.

FIG. 3 is a schematic flowchart of an architecture of an information processing system based on face recognition according to an embodiment of this application. As shown in FIG. 3, the information processing system may include the following modules:

(1) User Device Side

An application client is installed on the user equipment side. In the application client, a user instruction setting entry of the face recognition device is provided, which are a UI control module and a privacy control module respectively. The UI control module may be used to control interface attribute information, such as a font type, a font size, an interface color, an interface style, a style, or the like; and the privacy control module may be used to set the related operation logic of the interface, such as whether the secondary verification is required.

In practical applications, when controlling the font size, the UI control module may provide three grades such as large, medium, and small for the user to select; and when a color tone of the control interface is displayed, a bright color mode (for daytime) and a dark color mode (for nighttime) may be provided for the user to select. After the setting is completed, setting information may be written into the database of the application client in a specified format. The stored data is {ui_size:"big",color_type:"dark"}, and the data does not need to be transmitted to the backend.

The privacy control module provides functions such as "full mobile phone number", "silent mobile phone number", and "secondary password". A "full mobile phone number" function refers to that the face recognition device needs the full mobile phone number every time before the face recognition device can perform face recognition related applications; a "silent mobile phone number" function refers to an operation that after establishing a communication connection with the face recognition device, the user equipment side transparently transmits the mobile phone number directly through Bluetooth, WiFi, or the like, and the user does not need to input the mobile phone number on the device; and a "secondary password" function refers to that the mobile phone number may be exempted each time face recognition is performed, but a custom password needs to be additionally inputted (after the switch is set, the silent mobile phone number is required). After the related information of the privacy control module is set, the mobile phone number and the secondary password are transmitted to the backend server for storage, which is convenient for ensuring the security of subsequent face recognition verification.

After setting is completed, the setting information is written into the database of the application client, and the stored data may be {force_phone:"no",silence_phone: "135XXXXXX1",second_pwd:"sec_pwd_1"}.

When the user equipment side is close to the face recognition device side, the two establish a communication connection, and the user equipment side transmits the data stored in the database by the UI control module and the privacy control module to the face recognition device through the communication connection.

(2) Face Recognition Device Side

When the user equipment side is close to the face recognition device side, the user equipment side establishes a communication connection with the face recognition device side, and the face recognition device side receives the UI control module data and privacy control module data transmitted from the user equipment side.

After the face recognition device side receives the data, the data is transmitted to the parsing layer for parsing, to confirm whether the currently transmitted data is in line with expectations (such as whether the field is missing, or whether the transmitted content is legal. For example, if an illegal color_type is transmitted, the related services need to be rejected). After the parsing succeeds, the data is transmitted to the UI control layer.

When the user performs face recognition, the UI control layer first controls the UI according to the instructions of the UI control module, such as resizing UI buttons and text, and switching an interface style. If the parsing result indicates that a password input control is set, the password input interface is displayed; if the parsing result instructs to set the mobile phone number to fill, an interface for inputting the mobile phone number is not displayed, and the silent mobile phone number in the control protocol is used instead; and if the parsing result indicates that full mobile phone number input is set, then regardless of a policy in the backend face database, the full mobile phone number needs to be inputted.

After collecting the face image and obtaining the related information inputted by the user such as the mobile phone number or password, the face recognition device transmits the data to the backend face recognition service.

(3) Backend Service

The backend service performs user face recognition after receiving the face image uploaded by the face recognition device and the related information such as the mobile phone number or password. If a secondary password is set, the secondary password previously set by the user in the application client needs to be obtained through the mobile phone number uploaded by the current user and through the user privacy control service for comparison. If the secondary password is consistent, verification performed on the secondary password succeeds, otherwise the related services are rejected.

In the solution of this application, a face recognition device control instruction setting entry is provided on the application client, and the user equipment side writes the custom logical interface setting information into the database of the application client, so that when the user equipment is close to the face recognition device side, the setting information written into the database is transmitted to the face recognition device side. In this way, the face recognition device performs corresponding UI control to display a logical interface that conforms to the features of the user, thereby effectively improving the diversity of the face-scanning logical interface.

To better implement the information processing method based on face recognition provided in this embodiment of this application, an apparatus based on the information processing method based on face recognition is further provided in this embodiment of this application. The meanings of the nouns are the same as those in the information processing method based on face recognition. For specific implementation details, reference may be made to the description in the method embodiments.

Figure 4:
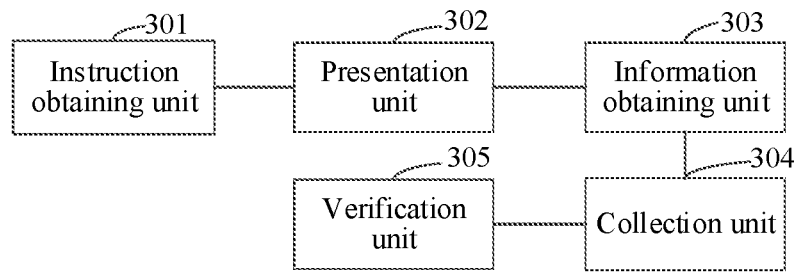
FIG. 4 is a schematic structural diagram of an information processing apparatus based on face recognition according to an embodiment of this application.

FIG. 4 is a schematic structural diagram of an information processing apparatus based on face recognition according to an embodiment of this application. The information processing apparatus may be set in a face recognition device, where the information processing apparatus may include an instruction obtaining unit 301, a presentation unit 302, an information obtaining unit 303, a collection unit 304, and a verification unit 305, and the details may be as follows:

an instruction obtaining unit 301, configured to obtain, after detecting that the face recognition device establishes a communication connection with user equipment, a user instruction transmitted by the user equipment, where the user instruction includes at least one preset parameter for setting an interface feature of a target logical interface on the face recognition device, and the target logical interface is used for verifying a user identity;

a presentation unit 302, configured to set the interface feature on the face recognition device according to the user instruction to generate the target logical interface;

an information obtaining unit 303, configured to obtain verification information of the user;

a collection unit 304, configured to collect a face image of a current user through the target logical interface; and a verification unit 305, configured to verify an identity of the current user based on the face image and the verification information.

In some embodiments, the user instruction includes: an interface identification parameter, an interface attribute parameter, and a security setting parameter of a to-be-displayed interface; and the presentation unit 302 may include:

an invoking subunit, configured to invoke a specified interface component to construct an initial logical interface corresponding to the interface identification parameter; and an adjustment subunit, configured to adjust the initial logical interface to obtain the target logical interface according to the interface attribute parameter and the security setting parameter; and a presentation subunit, configured to display the target logical interface.

In some embodiments, the interface attribute parameter is automatically set by the user equipment according to an age and a health status of the user inputted by the user.

In some embodiments, the interface attribute parameter and the security setting parameter are set by a user of the user equipment and stored in the user equipment, where the interface attribute parameter includes a font size, an interface color, and an interface style; and the security setting parameter includes a security level.

In some embodiments, the adjustment subunit may be configured to:

adjust an interface layout of the initial logical interface according to the security setting parameter, and associate corresponding operation logic with the adjusted initial logical interface; and adjust an interface attribute of the adjusted initial logical interface according to the interface attribute parameter.

In some embodiments, the information processing apparatus may further include:

a transmission unit, configured to transmit a system version update request to a server in response to detecting that adjustment performed on the initial logical interface fails; and an update unit, configured to update, in response to receiving update data returned by the server according to the version update request, a system version based on the update data.

In some embodiments, the information obtaining unit 303 may obtain the verification information of the user from the user equipment through the communication connection between the face recognition device and the user equipment; or obtain verification information inputted by the user through the target logical interface.

In some embodiments, when the information obtaining unit 303 obtains verification information inputted by the user through the target logical interface, the target logical interface includes: an input control; the information obtaining unit 303 may be configured to:

obtain the verification information inputted by the user through the input control;

determine operation logic corresponding to the input control; and prompt the user to re-input the verification information in a case that the verification information does not satisfy the operation logic corresponding to the input control.

In some embodiments, the input control includes: a first sub-control and a second sub-control; and in response to obtaining the verification information inputted by the user through the input control, the information obtaining unit 303 may be specifically configured to:

obtain a communication identifier inputted by the user through the first sub-control; and obtain password information inputted by the user through the second sub-control.

In some embodiments, to improve the processing speed, an offline recognition algorithm may be deployed in the information processing apparatus, and a local database including sample face images may be set up to implement offline recognition of a face image on a local side of the information processing apparatus. Alternatively, the face image and verification information may also be transmitted to the server, so as to implement online verification of the face image and verification information on the server side. When the information processing apparatus performs local verification, the verification unit 305 is configured to:

verify the face image based on a sample face image in a preset face database;

in a case that a target sample face image matching the face image is included in the preset face database, obtain a sample communication identifier and sample password information that are associated with the target sample face image;

verify the communication identifier based on the sample communication identifier, and verifying the password information based on the sample password information; and determine that verification performed on the identity of the current user succeeds in a case that verification performed on the communication identifier succeeds and verification performed on the password information succeeds.

In some embodiments, the instruction obtaining unit 301 is further configured to: transmit an interface setting request to the user equipment in response to a payment instruction triggered by the user on the face recognition device, where the user instruction is transmitted by the user equipment in response to the interface setting request.

In the information processing apparatus based on face recognition provided in this embodiment of this application, after detecting that the face recognition device establishes a communication connection with user equipment, the instruction obtaining unit 301 obtains a user instruction transmitted by the user equipment; the presentation unit 302 sets the interface feature on the face recognition device according to the user instruction to generate the target logical interface; the information obtaining unit 303 obtains the verification information of the user; the collection unit 304 collects a face image of a current user through the target logical interface; and the verification unit 305 verifies an identity of the current user based on the face image and the verification information. In this solution, the display of the logical interface of the face recognition device is controlled by providing an operation entry for setting customized face-related services through the application client, which implements the generation of a user interface (that is, a target logical interface) in a targeted manner based on features of a user, thereby effectively improving the fluency during using a face recognition device and the diversity of the functions, and causing a verification result to be more reliable.

Figure 5:
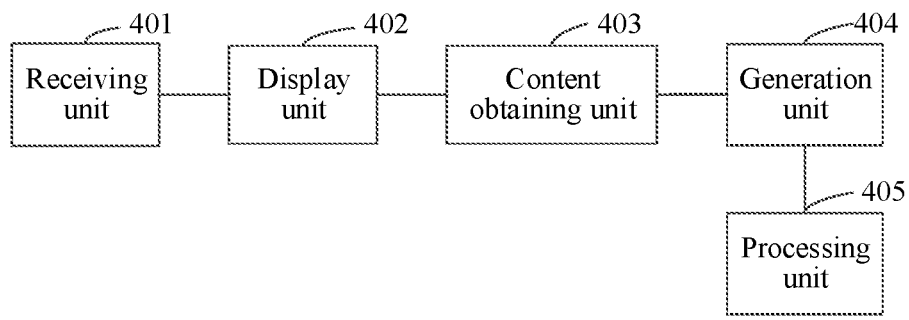
FIG. 5 is another schematic structural diagram of an information processing apparatus based on face recognition according to an embodiment of this application.

FIG. 5 is another schematic structural diagram of an information processing apparatus based on face recognition according to an embodiment of this application. The information processing apparatus may be set in the user equipment, where the information processing apparatus may include a receiving unit 401, a display unit 402, a content obtaining unit 403, a generation unit 404, and a processing unit 405, which may be specifically as follows:

a receiving unit 401, configured to receive a logical interface setting instruction triggered by a user through a user operation page displayed by an application;

a display unit 402, configured to display a first logical interface setting page according to the logical interface setting instruction;

a content obtaining unit 403, configured to obtain target content inputted by the user through the first logical interface setting page; and a generation unit 404, configured to generate configuration information based on the target content; and a processing unit 405, configured to transmit, after detecting that the user equipment establishes a communication connection with a face recognition device, a user instruction to the face recognition device based on the configuration information, the user instruction including at least one preset parameter for setting an interface feature of a target logical interface on the face recognition device, and the target logical interface being used for verifying an identity of a user; the face recognition device setting the interface feature on the face recognition device according to the user instruction to generate the target logical interface; and obtaining verification information of the user, collecting a face image of a current user through the target logical interface, and verifying an identity of the current user based on the face image and the verification information.

In some embodiments, the target content includes a communication identifier and password information of the user; and the content obtaining unit 403 is further configured to: transmit the obtained communication identifier and password information to the server for storage.

In some embodiments, the display unit 402 is further configured to:

after transmitting a user instruction to the face recognition device based on the configuration information, in response to detecting a second logical interface setting instruction triggered by the user through the user operation page, display a second logical interface setting page based on the second logical interface setting instruction, where the second logical interface setting page displays setting content corresponding to the configuration information.

In some embodiments, the receiving unit 401 is further configured to: receive an interface setting request transmitted by the face recognition device, where the interface setting request is transmitted by the face recognition device in response to a payment instruction triggered by the user on the face recognition device; and the processing unit 405 is further configured to: transmit the user instruction to the face recognition device based on the pre-saved configuration information in response to the interface setting request.

In the information processing apparatus based on face recognition provided in this embodiment of this application, when the receiving unit 401 receives the logical interface setting instruction triggered by the user through the user operation page displayed by the application, the display unit 402 displays the logical interface setting page according to the logical interface setting instruction; the content obtaining unit 403 obtains target content inputted by the user through the logical interface setting page; and the generation unit 404 generates configuration information based on the target content; and after detecting that the user equipment establishes a communication connection with the face recognition device, the processing unit 405 transmits a user instruction to the face recognition device based on the configuration information. In this solution, the display of the logical interface of the face recognition device is controlled by providing an operation entry for setting customized face-related services through the application client, which implements the generation of a user interface (that is, a target logical interface) in a targeted manner based on features of a user, thereby effectively improving the fluency during using a face recognition device and the diversity of the functions, and causing a verification result to be more reliable.

Figure 6:
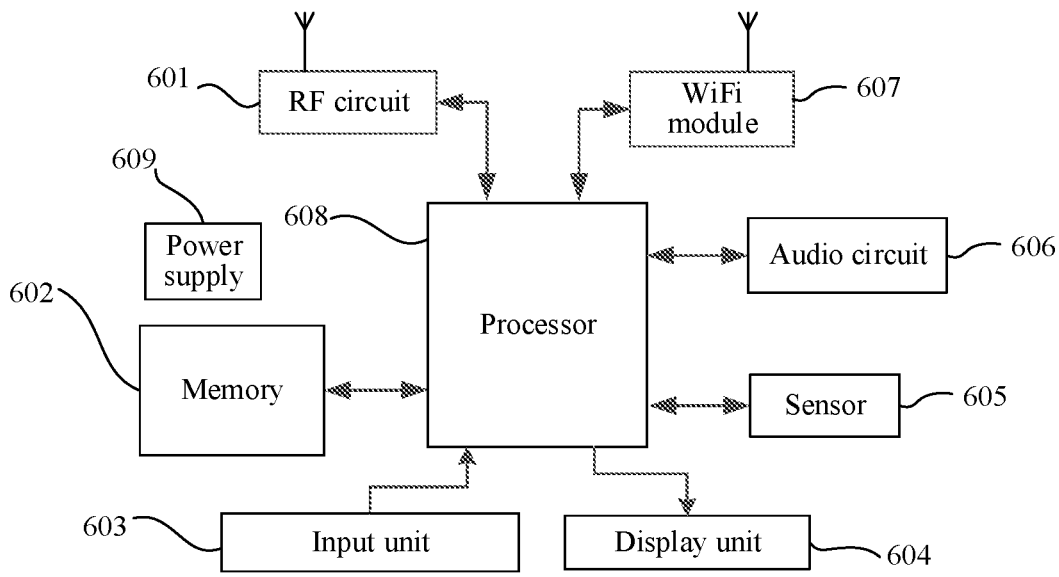
FIG. 6 is a schematic structural diagram of a terminal according to an embodiment of this application.

This embodiment of this application further provides a terminal, and the terminal may specifically be terminal devices such as a terminal device with a camera, such as a smart phone, a tablet computer, or a self-service ordering machine. As shown in FIG. 6, the terminal may include components such as a radio frequency (RF) circuit 601, a memory 602 including one or more computer-readable storage media, an input unit 603, a display unit 604, a sensor 605, an audio circuit 606, a Wireless Fidelity (WiFi) module 607, a processor 608 including one or more processing cores, a power supply 609, and the like. A person skilled in the art may understand that a terminal structure shown in FIG. 6 constitutes no limitation on the terminal, and the terminal may include more or fewer components than those shown in the figure, or some components may be combined, or a different component deployment may be used.

The RF circuit 601 may be configured to receive and transmit a signal during the sending and receiving of information or during a call. In particular, downlink information of a base station is processed by one or more processors 608 after being received. In addition, uplink data is sent to the base station. Generally, the RF circuit 601 includes but is not limited to an antenna, at least one amplifier, a tuner, one or more oscillators, a subscriber identity module (SIM) card, a transceiver, a coupler, a low noise amplifier (LNA), duplexer, and the like. In addition, the RF circuit 601 may also communicate with networks and other devices via wireless communication. The wireless communication may use any communication standard or protocol, including, but not limited to, Global System for Mobile Communications (GSM), General Packet Radio Service (GPRS), Code Division Multiple Access (CDMA), Wideband Code Division Multiple Access (WCDMA), Long Term Evolution (LTE), email, Short Messaging Service (SMS), and the like.

The memory 602 may be configured to store a software program and a module, and the processor 608 runs the software program and the module that are stored in the memory 602, to implement various functional applications and data processing. The memory 602 may mainly include a program storage area and a data storage area. The program storage area may store an operating system, an application program required by at least one function (for example, a sound playback function and an image display function), and the like. The data storage area may store data (for example, audio data and a phone book) created according to use of the terminal. In addition, the memory 602 may include a high speed random access memory, and may further include a non-volatile memory, such as at least one magnetic disk storage device, a flash memory, or another volatile solid storage device. Correspondingly, the memory 602 may further include a memory controller, so as to provide access of the processor 608 and the input unit 603 to the memory 602.

The input unit 603 may be configured to receive input digit or character information, and generate a keyboard, mouse, joystick, optical, or track ball signal input related to a user setting and function control. Specifically, in a specific embodiment, the input unit 603 may include a touch-sensitive surface and another input device. The touch-sensitive surface, which may also be referred to as a touch screen or a touch panel, may collect a touch operation of a user on or near the touch-sensitive surface (such as an operation of a user on or near the touch-sensitive surface by using any suitable object or accessory such as a finger or a stylus), and drive a corresponding connection apparatus according to a preset program. Optionally, the touch-sensitive surface may include two parts: a touch detection apparatus and a touch controller. The touch detection apparatus detects a touch orientation of the user, detects a signal brought through the touch operation, and transmits the signal to the touch controller. The touch controller receives the touch information from the touch detection apparatus, converts the touch information into touch point coordinates, and transmits the touch point coordinates to the processor 608. Moreover, the touch controller may receive and execute a command transmitted from the processor 608. In addition, a variety of types such as resistive, capacitive, infrared, and surface acoustic waves may be used for implementing the touch-sensitive surface. Except the touch-sensitive surface, the input unit 603 may further include other input devices. Specifically, the another input device may include, but not limited to, one or more of a physical keyboard, a function key (such as a volume control key or a switch key), a trackball, a mouse, or a joystick.

The display unit 604 may be configured to display information inputted by the user or provided for the user, and various graphical user interfaces of the terminal. The graphical user interfaces may be composed of graphics, text, icons, videos, and any combination thereof The display unit 604 may include a display panel. Optionally, the display panel may be configured by using a liquid crystal display (LCD), an organic light-emitting diode (OLED), or the like. Further, the touch-sensitive surface may overlay the display panel.

After detecting a touch operation on or near the touch-sensitive surface, the touch-sensitive surface transfers the touch operation to the processor 608 to determine a type of a touch event, and then the processor 608 provides corresponding visual output on the display panel according to the type of the touch event. Although, in FIG. 6, the touch-sensitive surface and the display panel are used as two separate components to implement input and output functions, in some embodiments, the touch-sensitive surface and the display panel may be integrated to implement the input and output functions.

The terminal may further include at least one sensor 605, such as an optical sensor, a motion sensor, and other sensors. Specifically, the optical sensor may include an ambient light sensor and a proximity sensor. The ambient light sensor may adjust brightness of the display panel according to brightness of the ambient light. The proximity sensor may switch off the display panel and/or backlight when the terminal is moved to an ear. As one type of the motion sensor, a gravity acceleration sensor may detect a value of acceleration at each direction (which generally is triaxial), may detect a value and a direction of the gravity when being static, and may be configured to identify an application of a mobile phone gesture (such as a handover between horizontal and longitudinal screens, a related game, and gesture calibration of a magnetometer), a related function of vibration identification (such as a pedometer and a knock), and the like. Another sensor, such as a gyroscope, a barometer, a hygrometer, a thermometer, and an infrared sensor, which can be configured in the terminal is not described herein again.

The audio circuit 606, a speaker, and a microphone may provide an audio interface between the user and the terminal. The audio circuit 606 may transmit, to the speaker, an electrical signal obtained through conversion of the received audio data, and the speaker converts the electrical signal into a sound signal to be outputted. According to another aspect, the microphone converts the collected sound signal into an electrical signal, the electrical signal is converted into audio data after received by the audio circuit 606, and the audio data is transmitted to another terminal through the RF circuit 601 after being outputted to the processor 608 for processing, or the audio data is outputted to the memory 602 for further processing. The audio circuit 606 may further include an earplug jack to provide communication between a peripheral headset and the terminal.

WiFi belongs to a short distance wireless transmission technology. The terminal may help, by using the WiFi module 607, the user transmit and receive an email, browse a webpage, and access streaming media. This provides wireless broadband Internet access for the user. Although FIG. 6 shows the WiFi module 607, it may be understood that the WiFi module is not a necessary component of the terminal, and the WiFi module may be omitted as required provided that the scope of the essence of the present invention is not changed.

The processor 608 is the control center of the terminal, and is connected to various parts of the mobile phone by using various interfaces and lines. By running or executing the software program and/or module stored in the memory 602, and invoking data stored in the memory 602, the processor performs various functions and data processing of the terminal, thereby performing overall monitoring on the mobile phone. Optionally, the processor 608 may include one or more processing cores. Preferably, the processor 608 may integrate an application processor and a modem. The application processor mainly processes an operating system, a user interface, an application program, and the like. The modem mainly processes wireless communication. It may be understood that the foregoing modem may either not be integrated into the processor 608.

The terminal further includes a power supply 609 (such as a battery) that supplies power to various components. Preferably, the power supply may be logically connected to the processor 608 through a power management system, so that functions such as charging, discharging, and power management may be managed through the power management system. The power supply 609 may further include one or more of a direct current or alternating current power supply, a re-charging system, a power failure detection circuit, a power supply converter or inverter, a power supply state indicator, and any other component.

Although not shown, the terminal may further include a camera, a Bluetooth module, and the like. Details are not described herein again. Specifically, in this embodiment, the processor 608 in the terminal may load executable files corresponding to processes of one or more applications to the memory 602 according to the following instructions, and the processor 608 runs an application stored in the memory 602, to implement various functions as follows:

For example, in response to detecting that a communication connection is established with user equipment, a user instruction transmitted by the user equipment is obtained; the target logical interface is generated and displayed according to the user instruction; verification information of a user is obtained; a face image of the current user is collected through the target logical interface; and a verification result of verifying the identity of the current user is obtained based on the face image and the verification information.

In another example, a first logical interface setting instruction triggered by the user through the user operation page displayed by an application is received; a first logical interface setting page is displayed according to the first logical interface setting instruction; target content inputted by the user through the first logical interface setting page is obtained; configuration information is generated based on the target content; and after detecting that a communication connection is established with the face recognition device, a user instruction is transmitted to the face recognition device based on the configuration information.

In this embodiment of this application, the display of the logical interface of the face recognition device may be controlled by providing an operation entry for setting customized face-related services through the application client in the user equipment, and the face recognition device constructs the corresponding logical interface through the interface components according to the instructions of the user equipment for the user to operate, which implement the generation of a user interface (that is, a target logical interface) in a targeted manner based on features of a user, thereby effectively improving the fluency during using a face recognition device and the diversity of the functions, and causing a verification result to be more reliable.

A person of ordinary skill in the art may understand that, all or some steps of the methods in the foregoing embodiments may be implemented by using instructions, or implemented through instructions controlling relevant hardware, and the instructions may be stored in a computer-readable storage medium and loaded and executed by a processor.

Accordingly, this embodiment of this application provides a computer-readable storage medium, storing a plurality of instructions, the plurality of instructions, being loaded by the processor, to perform the steps in any information processing method based on face recognition according to this embodiment of this application. For example, the instructions may perform the following steps:

For example, in response to detecting that a communication connection is established with user equipment, a user instruction transmitted by the user equipment is obtained; the target logical interface is generated and displayed according to the user instruction; verification information of a user is obtained; a face image of the current user is collected through the target logical interface; and a verification result of verifying the identity of the current user is obtained based on the face image and the verification information.

In another example, a first logical interface setting instruction triggered by the user through the user operation page displayed by an application is received; a first logical interface setting page is displayed according to the first logical interface setting instruction; target content inputted by the user through the first logical interface setting page is obtained; and configuration information is generated based on the target content; and after detecting that a communication connection is established with the face recognition device, a user instruction is transmitted to the face recognition device based on the configuration information.

In this embodiment of this application, the display of the logical interface of the face recognition device may be controlled by providing an operation entry for setting customized face-related services through the application client in the user equipment, and the face recognition device constructs the corresponding logical interface through the interface components according to the instructions of the user equipment for the user to operate, which implement the generation of a user interface (that is, a target logical interface) in a targeted manner based on features of a user, thereby effectively improving the fluency during using a face recognition device and the diversity of the functions, and causing a verification result to be more reliable.

For specific implementation of the foregoing operations, reference may be made to the foregoing embodiments. Details are not described herein again.

The storage medium may include: a read-only memory (ROM), a random access memory (RAM), a magnetic disk, an optical disc, or the like.

Because the instructions stored in the storage medium may perform the steps of any information processing method based on face recognition provided in the embodiments of this application, the instructions can implement beneficial effects that may be implemented by any information processing method based on face recognition provided in the embodiments of this application. For details, reference may be made to the foregoing embodiments. Details are not described herein again.

In sum, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

The information processing method and apparatus based on face recognition, a storage medium, and a terminal are described in detail above. The principle and implementations of this application are described in this specification by using specific examples. The descriptions of the foregoing embodiments are merely used for helping understand the method and core ideas of this application. Meanwhile, a person of skill in the art may make modifications to the specific implementations and application scopes according to the ideas of this application. In conclusion, the content of the specification should not be construed as a limitation to this application.

What is claimed is:

1. An information processing method, performed by an electronic device acting as a face recognition device, the method comprising:
 in response to detecting a communication connection between the electronic device and a user equipment through short-range communication, obtaining a user instruction transmitted by a current user of the user equipment, the user instruction comprising an interface identification parameter, an interface attribute parameter, and a security setting parameter for setting an interface feature of a target logical interface on the electronic device, and the target logical interface being used for verifying an identity of a user;
 generating the target logical interface, by setting the interface feature based on the user instruction transmitted by the user equipment, further comprising:
  invoking a first interface component to construct, based on the interface identification parameter, an initial logical interface;
  customizing the initial logical interface, based on the interface attribute parameter and the security setting parameter, to obtain the target logical interface; and
  displaying the target logical interface to the current user;
 obtaining verification information of the current user through the target logical interface;
 collecting a face image of the current user captured by a camera of the electronic device through the target logical interface; and
 verifying an identity of the current user based on the face image and the verification information.

2. The method according to claim 1, wherein the interface attribute parameter and the security setting parameter are set by a user of the user equipment and stored in the user equipment, wherein the interface attribute parameter comprises a font size, an interface color, and an interface style; and the security setting parameter comprises a security level.

3. The method according to claim 1, wherein the interface attribute parameter is automatically set by the user equipment according to an age and a health status of the user provided to the user equipment.

4. The method according to claim 1, wherein customizing the initial logical interface comprises:
 adjusting, based on the security setting parameter, an interface layout of the initial logical interface, and associating corresponding operation logic with the adjusted initial logical interface; and
 adjusting, based on interface attribute parameter, an interface attribute of the adjusted initial logical interface.

5. The method according to claim 1, further comprising:
 in response to detecting a failed adjustment on the initial logical interface, transmitting a system version update request to a server; and
 in response to receiving update data from the server according to the system version update request, updating a system version based on the update data.

6. The method according to claim 1, wherein obtaining verification information of the user comprises:
   obtaining the verification information of the user from the user equipment through the communication connection between the electronic device and the user equipment; or
   obtaining verification information provided by the user through the target logical interface.

7. The method according to claim 6, wherein the target logical interface comprises: an input control; and
   obtaining the verification information provided by the user through the target logical interface comprises:
   obtaining the verification information provided by the user through the input control;
   determining operation logic corresponding to the input control; and
   in accordance with a determination that the verification information fails to satisfy the operation logic corresponding to the input control: prompting the user to provide the verification information once more.

8. The method according to claim 7, wherein the input control comprises: a first sub-control and a second sub-control; and
   obtaining the verification information provided by the user through the input control comprises:
   obtaining a communication identifier provided by the user through the first sub-control; and
   obtaining password information provided by the user through the second sub-control.

9. The method according to claim 8, wherein verifying the identity of the current user based on the face image and the verification information comprises:
   verifying the face image based on a sample face image in a preset face database;
   in accordance with a determination that a target sample face image in the preset face database matches the face image, obtaining a sample communication identifier and sample password information associated with the target sample face image;
   verifying the communication identifier based on the sample communication identifier, and verifying the password information based on the sample password information; and
   in accordance with a determination that verification performed on the communication identifier succeeds and verification performed on the password information succeeds, determining that the identity of the current user is verified.

10. The method according to claim 1, further comprising:
    in response to a detecting a payment instruction from the user on the electronic device, transmitting an interface setting request to the user equipment, wherein
    the user instruction is transmitted by the user equipment in response to the interface setting request.

11. An electronic device acting as a face recognition device, comprising:
    one or more processors; and
    memory storing one or more programs, the one or more programs comprising instructions that, when executed by the one or more processors, cause the one or more processors to perform operations comprising:
    in response to detecting a communication connection between the electronic device and a user equipment through short-range communication, obtaining a user instruction transmitted by a current user of the user equipment, the user instruction comprising an interface identification parameter, an interface attribute parameter, and a security setting parameter for setting an interface feature of a target logical interface on the electronic device, and the target logical interface being used for verifying an identity of a user;
    generating the target logical interface, by setting the interface feature based on the user instruction transmitted by the user equipment, further comprising:
    invoking a first interface component to construct, based on the interface identification parameter, an initial logical interface;
    customizing the initial logical interface, based on the interface attribute parameter and the security setting parameter, to obtain the target logical interface; and
    displaying the target logical interface to the current user;
    obtaining verification information of the current user through the target logical interface;
    collecting a face image of the current user captured by a camera of the electronic device through the target logical interface; and
    verifying an identity of the current user based on the face image and the verification information.

12. The electronic device according to claim 11, wherein the interface attribute parameter and the security setting parameter are set by a user of the user equipment and stored in the user equipment, wherein the interface attribute parameter comprises a font size, an interface color, and an interface style; and the security setting parameter comprises a security level.

13. The electronic device according to claim 11, wherein the interface attribute parameter is automatically set by the user equipment according to an age and a health status of the user provided to the user equipment.

14. The electronic device according to claim 11, wherein customizing the initial logical interface comprises:
    adjusting, based on the security setting parameter, an interface layout of the initial logical interface, and associating corresponding operation logic with the adjusted initial logical interface; and
    adjusting, based on interface attribute parameter, an interface attribute of the adjusted initial logical interface.

15. The electronic device according to claim 11, wherein the operations further comprise:
    in response to detecting a failed adjustment on the initial logical interface, transmitting a system version update request to a server; and
    in response to receiving update data from the server according to the system version update request, updating a system version based on the update data.

16. A non-transitory computer-readable storage medium, storing a computer program, the computer program, when executed by one or more processors of an electronic device acting as a face recognition device, cause the one or more processors to perform operations comprising:
    in response to detecting a communication connection between the electronic device and a user equipment through short-range communication, obtaining a user instruction transmitted by a current user of the user equipment, the user instruction comprising an interface identification parameter, an interface attribute parameter, and a security setting parameter for setting an interface feature of a target logical interface on the electronic device, and the target logical interface being used for verifying an identity of a user;
    generating the target logical interface, by setting the interface feature based on the user instruction transmitted by the user equipment, further comprising:

invoking a first interface component to construct, based on the interface identification parameter, an initial logical interface;

customizing the initial logical interface, based on the interface attribute parameter and the security setting parameter, to obtain the target logical interface; and displaying the target logical interface to the current user;

obtaining verification information of the current user through the target logical interface;

collecting a face image of the current user captured by a camera of the electronic device through the target logical interface; and verifying an identity of the current user based on the face image and the verification information.

17. The non-transitory computer-readable storage medium according to claim 16, wherein the interface attribute parameter and the security setting parameter are set by a user of the user equipment and stored in the user equipment, wherein the interface attribute parameter comprises a font size, an interface color, and an interface style; and the security setting parameter comprises a security level.

18. The non-transitory computer-readable storage medium according to claim 16, wherein the interface attribute parameter is automatically set by the user equipment according to an age and a health status of the user provided to the user equipment.

19. The non-transitory computer-readable storage medium according to claim 16, wherein customizing the initial logical interface comprises:

adjusting, based on the security setting parameter, an interface layout of the initial logical interface, and associating corresponding operation logic with the adjusted initial logical interface; and adjusting, based on interface attribute parameter, an interface attribute of the adjusted initial logical interface.

20. The non-transitory computer-readable storage medium according to claim 16, wherein the operations further comprise:

in response to detecting a failed adjustment on the initial logical interface, transmitting a system version update request to a server; and in response to receiving update data from the server according to the system version update request, updating a system version based on the update data.

* * * * *